3,641,015
7 - (PHENYLACETYLAMINO)CEPHALOSPORIN CARBOXAMIDES AND 7 - (THIOPHENE - 2-ACETYLAMINO) CEPHALOSPORIN CARBOXAMIDES

Benjamin Arthur Lewis, Suffern, Martin Leon Sassiver, Monsey, and Robert Gordon Shepherd, South Nyack, N.Y., assignors to American Cyanamid Company, Stamford, Conn.
No Drawing. Filed Jan. 17, 1969, Ser. No. 792,151
Int. Cl. C07d 99/24
U.S. Cl. 260—243 C        8 Claims

ABSTRACT OF THE DISCLOSURE

This disclosure describes compounds of the class of 7-(phenylacetylamino)cephalosporin carboxamides and 7-(thiophene-2-acetylamino)cephalosporin carboxamides, useful as anti-bacterial agents.

BRIEF SUMMARY OF THE INVENTION

This invention relates to new derivatives of 7-aminocephalosporanic acid and, more particularly, is concerned with novel compounds which may be represented by the following general formula:

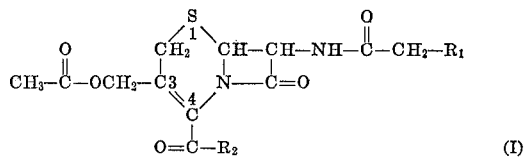

wherein $R_1$ is phenyl or 2-thienyl and $R_2$ is amino, hydroxyamino, lower alkoxyamino, phenoxyamino, phenylhydrazino, substituted-phenylhydrazino or a moiety of the formula:

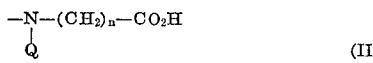

wherein $n$ is an integer from 1 to 4 and Q is phenyl, 2-pyridyl, 2-thiazolyl, 2-pyrimidyl or 2-pyrazinyl. Suitable lower alkoxy groups are those having from 1 to 4 carbon atoms such as methoxy, ethoxy, isopropoxy, n-butoxy, etc. Suitable substituted phenyl groups may be, for example, halophenyl such as p-chlorophenyl, m-bromophenyl, o-chlorophenyl, and the like; lower alkylphenyl wherein lower alkyl is from 1 to 4 carbon atoms such as p-ethylphenyl, m-methylphenyl, o-isopropylphenyl, etc.; and lower alkoxyphenyl wherein lower alkoxy is from 1 to 4 carbon atoms such as p-n-propoxyphenyl, m-ethoxyphenyl, o-methoxyphenyl, and the like.

DETAILED DESCRIPTION OF THE INVENTION

Some typical $R_2$ groups contemplated by the present invention are, for example, methoxyamino, ethoxyamino, isopropoxyamino, p-iodophenylhydrazino, m-chlorophenylhydrazino, o-bromophenylhydrazino, p-isopropylphenylhydrazino, m-ethylphenylhydrazino, o-methylphenylhydrazino, p-ethoxyphenylhydrazino, m-methoxyphenylhydrazino, o-n-propoxyphenylhydrazino, N-(2-pyridyl)-N-(carboxymethyl)amino, N-(2-thiazolyl)-N-carboxymethyl)amino, N-(2-pyrimidyl) - N - (carboxymethyl)amino, N-(2-pyrazinyl) - N-(carboxymethyl)amino, N-phenyl-N-(carboxymethyl)amino, and the like.

Also embraced within the scope of the present invention are the non-toxic, pharmaceutically acceptable salts of these derivatives of 7-aminocephalosporanic acid when $R_2$ is a moiety of Formula II above. The cations comprised in these salts include, for example, the non-toxic metal cations such as the sodium ion, potassium ion, calcium ion, magnesium ion, as well as the organic amine cations such as the tri(lower alkyl)amine cations (e.g., triethylamine), procaine, and the like.

The novel compounds of the present invention may be readily prepared by acylating an amine of the formula H—$R_2$ with 7-(phenylacetylamino)cephalosporanic acid chloride or with 7-(thiophene-2-acetylamino)cephalosporanic acid chloride. In this acylation, all or much of the inactive $\Delta^2$-isomer is formed along with the desired active cephalosporins ($\Delta^3$ compounds) unless special reaction conditions are employed. Use of diisopropylethylamine as acid acceptor gives little if any isomerization while triethylamine, N-methylmorpholine and various other bases or an excess of certain amine reactants produce substantial or predominant $\Delta^2$ formation.

In the reaction of 7-(thiophene-2-acetylamino)cephalosporanic acid chloride with amines of intermediate basicity, such as N-phenylglycine, the formation of substantial amounts of the $\Delta^2$-amide derivative along with the desired $\Delta^3$-isomer occurs unless special reaction conditions are used. Use of triethylamine as acid acceptor in this reaction leads to a 50: 50 mixture of $\Delta^3$- and $\Delta^2$-amides. Substitution of N-methylmorpholine has been used to avoid racemization in peptide synthesis. Under the same conditions, however, substitution of the sterically hindered amine, diisopropylethylamine, for triethylamine, gives a product of >90% $\Delta^3$ composition.

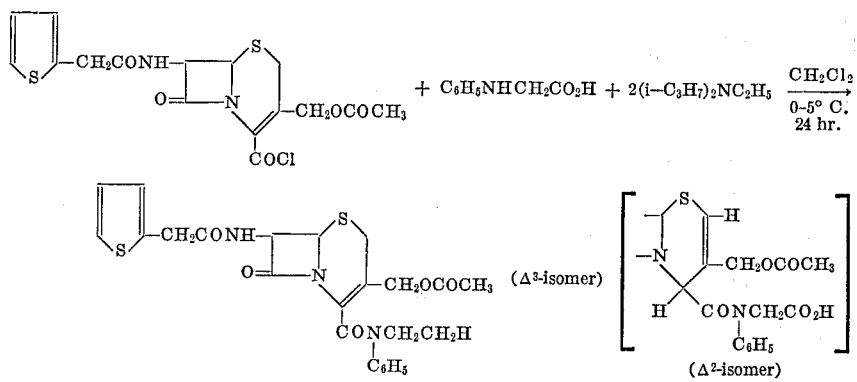

The role of triethylamine in causing isomerization of the double bond from the $\Delta^3$ to the $\Delta^2$ position is made apparent in several ways. The acid chloride itself can isomerize in the presence of triethylamine under ordinary reaction conditions, hence in any slow reaction to form a 4-carboxamide derivative, a substantial amount of $\Delta^2$- isomer would be formed from Δ² acid chloride in the reaction mixture. If the product of Example 6 is stored at 5° C. with triethylamine in methylene chloride, it isomerizes to a mixture of Δ³- and Δ²-isomers.

With less basic amine reagents, such as benzoyl hydrazide, use of excess of the reactant (2 equiv. per equiv. of acid chloride) as acid acceptor is sufficiently mild to prevent double-bond isomerization if the reaction is worked up after 2 hrs. After 24 hrs. substantial (80%) Δ² isomerization has occurred.

As a general procedure to avoid the possibility of Δ² formation, condensation of the cephalosporanic acid chloride with an amine to form an amide should be performed at 0–5° C. in methylene chloride with diisopropylmethylamine as acid acceptor, and the reaction should be worked up after 2 hrs. The reaction can be carried out using a diluent or solvent such as water or an organic solvent, for example, a ketone such as acetone, an ether such as tetrahydrofuran, or a halogenated hydrocarbon such as chloroform or methylene chloride. However, the reaction is preferably conducted in a solvent such as methylene chloride which dissolves all the reactants and is inert to the acid chloride. The reaction is also preferably carried out at a temperature of from about 0° C. to about 25° C., preferably at 0° C. to 5° C., and over a period of time of a few hours or less, if possible. The reaction course is followed by thin-layer chromatography and the product is isolated as soon as the reaction is reasonably complete in order to avoid isomerization of the amide product.

The novel compounds of the present invention are biologically active and have been found to possess antibacterial activity. As indicated, they are useful antimicrobial agents and have broad-spectrum antimicrobial activity in vitro against representative pathogenic microorganisms. The antibacterial spectrum of typical compounds of the present invention, representing the concentration required to inhibit completely the growth of various typical bacteria, was determined in a standard manner by the agar-dilution streak-plate technique which is commonly used in testing new antibiotics. The following tables summarize the absolute in vitro activity of 7-(thiophene-2-acetamido)cephalosporin-4-carboxamide (1),
7-(thiophene-2-acetamido)cephalosporin-4-hydroxamic acid (2),
7-(thiophene-2-acetamido)cephalosporin-4-hydroxamic acid methyl ester (3),
7-(thiophene-2-acetamido)cephalosporin-4-carbox-(phenoxy)amide (4),
7-(thiophene-2-acetamido)cephalosporin-4-carbox(N-methanesulfonyl)amide (5),
7-phenylacetamidocephalosporin-4-carboxamide (6),
7-(thiophene-2-acetamido)cephalosporin-4-carbox(N-carboxy-methyl-N-phenyl)amido (7),
7-(thiophene-2-acetamido)cephalosporin-4-carbox-(phenyl)hydrazide (8),
7-(thiophene-2-acetamido)cephalosporin-4-carbox(m-methylphenyl)hydrazide (9) and
7-(thiophene-2-acetamido)cephalosporin-4-carbox(p-chlorophenyl)hydrazide (10)

and the activity as compared with Cephalosporin C taken as unity.

TABLE I

| Organism | Minimal inhibitory concentration (mcg./ml.) | | | | |
|---|---|---|---|---|---|
| | (1) | (2) | (3) | (4) | (5) |
| Staphylococcus aureus No. 11 | 6 | 12 | 25 | 25 | |
| Staphylococcus aureus ATCC 13709 | 0.8 | 6 | 6 | 6 | |
| Streptococcus pyogenes C-203 | 0.8 | 1.6 | 6 | 3 | 3 |
| Bacillus cereus ATCC 10702 | 6 | 12 | 12 | 6 | |
| Activity relative to Cephalosporin C taken as unity | 20–60 | 8–16 | 4–8 | 4–16 | 8 |

TABLE II

| Organism | Minimal inhibitory concentration (mcg./ml.) | | | | |
|---|---|---|---|---|---|
| | (6) | (7) | (8) | (9) | (10) |
| Staphylococcus aureus No. 11 | 6 | 25 | 3 | 50 | 6 |
| Staphylococcus aureus ATCC 13709 | 0.8 | 6 | 1.6 | 12 | 3 |
| Streptococcus pyogenes C-203 | 0.4 | 3 | 0.4 | 0.8 | 0.8 |
| Bacillus cereus ATCC 10702 | 3 | 25 | 3 | 12 | 3 |
| Activity relative to Cephalosporin C taken as unity | 20–60 | 4–8 | 20–60 | 2–30 | 20–30 |

The high in vitro antibacterial activity of the novel compounds of the present invention makes them useful as nutritional supplements in animal feeds and as additives to materials which are subject to microbial deterioration such as cutting oils and fuel oils. They are also useful in soaps, shampoos and topical compositions for the treatment of wounds and burns.

The invention will be described in greater detail in conjunction with the following specific examples.

Example 1.—Preparation of 7-(thiophene-2-acetamido)-cephalosporanic acid chloride To a suspension of 7-(thiophene-2-acetamido)cephalosporanic acid (79.2 g., 0.2 millimole) in dichloromethane (5 ml.) was added one drop of dry dimethylformamide. The mixture was cooled in an ice-bath, and oxalyl chloride (63.5 mg., 0.5 millimole) was added with stirring After one hour the solution was evaporated under reduced pressure to give the acid chloride. The acid chloride was dissolved in dichloromethane (5 ml.) and used without purification. The infrared spectrum of the acid chloride in dichloromethane was in accord with the structure.

Example 2.—Preparation of 7-(phenylacetamido) cephalosporanic acid chloride

To a suspension of 7-(phenylacetamido)cephalosporanic acid (78.0 mg., 0.2 millimole) in dichloromethane (5 ml.) was added one drop of dry dimethylformamide. The mixture was cooled in an ice-bath, and oxalyl chloride (63.4 mg., 0.5 millimole) was added with stirring. After one hour the solution was evaporated under reduced pressure to give the acid chloride. The acid chloride was used without purification; its infrared spectrum in dichloromethane was in accord with the structure.

Example 3.—Preparation of 7-(thiophene-2-acetamido) cephalosporin-4-carboxamide

A solution of acid chloride, prepared from 7-(thiophene-2-acetamido)cephalosporanic acid (158 mg., 0.4 millimole) in dichloromethane (10 ml.) was added dropwise with stirring to benzene (10 ml.) saturated with anhydrous ammonia at 0° C. After 30 minutes the reaction mixture was evaporated to dryness under reduced pressure. The residue was triturated with water (10 ml.) and extracted with ethyl acetate (3× 15 ml.). The combined extracts were washed with sodium bicarbonate (2× 15 ml.), dried, (MgSO₄), and evaporated under reduced pressure to give the carboxamide as an ivory solid, 106 mg. The carboxamide was recrystallized from ethyl acetate to give fine white needles M.P. 238–240° C. dec. The infrared, ultraviolet and nuclear magnetic resonance spectra were in accord with the structure.

Example 4.—Preparation of 7-(phenylacetamido)cephalosporin-4-carboxamide

In the same manner as in Example 3, the acid chloride of 7-phenylacetamidocephalosporanic acid was treated with ammonia and the white product crystallized from ethyl aceate. The infrared, ultraviolet and nuclear magnetic resonance spectra confirmed the structure.

Example 5.—Preparation of 7-(thiophene-2-acetamido) cephalosporin-4-hydroxamic acid In an exactly similar manner to the preparation of the hydrazide, the acid chloride from 7-(thiophene-2-acetamido) cephalosporanic acid (158 mg., 0.4 millimole) was reacted with hydroxylamine hydrochloride (27.8 mg. 0.4 millimole) and triethylamine (81 mg., 0.8 millimole) to give the hydroxamic acid. The infrared spectrum was in accord with the structure.

Example 6.—Preparation of 7-(thiophene-2-acetamido) cephalosporin-4-hydroxamic acid methyl ester In an exactly similar manner to the preparation of the hydrazide, the acid chloride from 7-(thiophene-2-acetamido)cephalosphoranic acid (158 mg., 0.4 millimole) was reacted with methoxyamine (81 mg., 0.8 millimole) to give the hydroxamic ester. The infrared spectrum was in accord with the structure.

Example 7.—Preparation of 7-(thiophene-2-acetamido) cephalosporin-4-carbox(m-methylphenyl)hydrazide Using ice-bath conditions, one mmole of 7-(thiophene-2-acetamido)cephalosporanic acid chloride in 5 ml. of methylene chloride was added dropwise to a stirred solution of 154 mg. (1 mmole) of m-methylphenylhydrazine hydrochloride and 256 mg. (2 mmole) of diisopropylethylamine in 25 ml. of methylene chloride. The reaction was stirred for 1.5 hrs. at 0–5° C., then evaporated to dryness. The residue was triturated with water to form a crystalline solid after ethyl acetate extraction, and was filtered off to yield 207 mg. of product, M.P. 220° C.; homogeneous by thin-layer chromatography (TLC, 80% n-propanol-water) and 100% $\Delta^3$ by nuclear magnetic resonance spectrum.

Example 8.—Preparation of 7-(thiophene-2-acetamido) cephalosporin-4-carbox(phenyl)hydrazide In a similar manner to the preparation of the m-methylphenylhydrazide, this compound was synthesized on a one mmole scale from phenylhydrazine hydrochloride. However, ethyl acetate extraction of the reaction residue dissolved the product. Evaporation gave 355 mg., M.P. 208° C., homogeneous by thin-layer chromatography and >90% $\Delta^3$ by nuclear magnetic resonance spectrum.

Example 9.—Preparation of 7-(thiophene-2-acetamido) cephalosporin-4-carbox(p-chlorophenyl)hydrazide This compound was obtained exactly as described for the phenylhydrazide in a yield of 320 mg., M.P. 185° C. (dec.), homogeneous by thin-layer chromatography and 100% $\Delta^3$ by nuclear magnetic resonance spectrum.

Example 10.—Preparation of 7-(thiophene-2-acetamido) cephalosporin-4-carbox(phenoxy)amide This compound was synthesized as described for the phenylhydrazide to give 280 mg., M.P. 165° C. (dec.), homogeneous by thin-layer chromatography and 100% $\Delta^3$ by nuclear magnetic resonance spectrum.

Example 11.—Preparation of 7-(thiophene-2-acetamido) cephalosphorin - 4 - carbox(N-carboxymethyl-N-phenyl)amide A solution of 1 mmole of 7-(thiophene-2-acetamido)-cephalosporanic acid chloride in 10 ml. of methylene chloride was added dropwise to a stirred, cooled (0.5° C.) solution of 151 mg. (1 mmole) of N-phenylglycine and 256 mg. (2 mmole) of diisopropylethylamine in 20 ml. of methylene chloride. After 2.5 hrs. at 0–5° C., the reaction was evaporated to dryness, dissolved in water, and acidified with dilute hydrochloric acid to pH 1. Extraction with ethyl acetate gave, on evaporation, 416 mg. M.P. 130° C. (dec.), homogeneous by thin-layer chromatography and ca. 90% $\Delta^3$ by nucelar magnetic resonance spectrum.

Example 12

Preparation of 7-(phenylacetamido)cephalosporin-4-carbox(N-carboxymethyl-N-phenyl)amide This compound was prepared in a manner similar to that described for the product of Example 11 except that 7-phenylacetamidocephalosporanic acid chloride was employed. The compound, after recrystallization from ethyl acetate, was shown to be homogeneous by thin-layer chromatography and 100% $\Delta^3$ by nuclear magnetic resonance spectrum.

Example 13

Preparation of 7-(thiophene-2-acetamido)cephalosporin-4-carbox(N-methanesulfonyl)amide A solution of 1 mmole of 7-(thiophene-2-acetamido) cephalosporanic acid chloride in 10 ml. of methylene chloride was added dropwise to a stirred suspension of 234 mg. (2.2 mmole) of sodium methanesulfonamide (NaNHSO$_2$CH$_3$)

in 5 ml. of methylene chloride. After one hour at 0–5° C. a clear solution was obtained. After a total of 3 hrs. the reaction mixture was evaporated to dryness and dissolved in water. Acidification to pH 1 with dilute hydrochloric acid and extraction with ethyl acetate gave 392 mg., M.P. 132° C. (dec.), homogeneous by thin-layer chromatography and 100% $\Delta^3$ by nuclear magnetic resonance. Sulfonyl absorption at 7.5, 8.7$\mu$ was seen in the infrared spectrum.

Example 14.—Preparation of 7 - (phenylacetamido) cephalosporin - 4 - carbox[N - carboxymethyl - N - (2-pyrimidyl)]amide This compound was prepared in a manner similar to that described for the product of Example 12 except that N-(2-pyrimidyl)glycine was employed in place of the N-phenylglycine of that example. The compound, after recrystallization from ethyl acetate, was shown to be homogeneous by thin-layer chromatography and 100% $\Delta^3$ by nuclear magnetic resonance spectrum.

Example 15.—Preparation of N-(2-pyrimidyl)glycine 2-chloropyrimidine (11.4 g.) in dioxane solution was added to an aqueous solution of 7.5 g. of glycine in dilute alkali and the mixture was stirred for two hours. The product crystallized from the aqueous solution upon acidification.

We claim:
1. A compound selected from the group consisting of those of the formula

$$\begin{array}{c} \text{CH}_3-\overset{O}{\overset{\|}{C}}-\text{OCH}_2-\overset{S}{\underset{C}{\bigg\langle}}\overset{CH_2}{\underset{N-C=O}{\bigg|}}\overset{CH-CH-NH-\overset{O}{\overset{\|}{C}}-CH_2-R_1}{\underset{|}{\bigg|}} \\ O=\overset{|}{C}-R_2 \end{array} \quad \text{(I)}$$

wherein R$_1$ is selected from the group consisting of phenyl and 2-thienyl and R$_2$ is selected from the group consisting of hydroxyamino, lower alkoxyamino, phenoxyamino, phenylhydrazino and moieties of the formulae:

$$-\text{NH}-\text{NH}-\underset{R_3}{\bigg\langle}\!\!\!\bigcirc \quad \text{(II)}$$

$$-\underset{Q}{\overset{|}{N}}-(\text{CH}_2)_n-\text{CO}_2\text{H} \quad \text{(III)}$$

wherein R$_3$ is selected from the group consisting of chloro, bromo, iodo, lower alkyl and lower alkoxy, $n$ is an integer from 1 to 4 and Q is selected from the group consisting of phenyl, 2-pyridyl, 2-thiazolyl, 2-pyrimidyl and 2-pyrazinyl; and the non-toxic pharmaceutically acceptable basic salts thereof when R$_2$ is a moiety of Formula III.

2. A compound according to claim 1 wherein $R_1$ is 2-thienyl and $R_2$ is phenylhydrazino.

3. A compound according to claim 1 wherein $R_1$ is 2-thienyl and $R_2$ is hydroxyamino.

4. A compound according to claim 1 wherein $R_1$ is 2-thienyl and $R_2$ is methoxyamino.

5. A compound according to claim 1 wherein $R_1$ is 2-thienyl and $R_2$ is a moiety of Formula II wherein $R_3$ is 4-chloro.

6. A compound according to claim 1 wherein $R_1$ is 2-thienyl and $R_2$ is a moiety of Formula II wherein $R_3$ is 3-methyl.

7. A compound according to claim 1 wherein $R_1$ is phenyl and $R_2$ is a moiety of Formula III wherein $n$ is 1 and Q is phenyl.

8. A compound according to claim 1 wherein $R_1$ is 2-thienyl and $R_2$ is a moiety of Formula III wherein $n$ is 1 and Q is phenyl.

References Cited

UNITED STATES PATENTS

| | | | |
|---|---|---|---|
| 3,459,747 | 8/1969 | Lewis et al. | 260—243 C |
| 3,466,275 | 9/1969 | Morin et al. | 260—243 C |

NICHOLAS S. RIZZO, Primary Examiner

U.S. Cl. X.R.

424—246

UNITED STATES PATENT OFFICE
CERTIFICATE OF CORRECTION

Patent No. 3,641,015    Dated February 8, 1972

Inventor(s) Benjamin Arthur Lewis, Robert Gordon Shepherd, Martin Leon Sassiver

It is certified that error appears in the above-identified patent and that said Letters Patent are hereby corrected as shown below:

Column 2, line 43, insert after methylmorpholino -- for triethylamine gives similar results, even though N-methylmorpholine --.

Column 3, line 14, "diisopropylmethylamine" should be -- diisopropylethylamine --.

Column 3, line 55, "amido" should be -- amide --.

Column 5, lines 5,6, take out Example 5. -- Preparation of 7-(thiophene-2-acetamido) and insert after 7-(thiophene-2-ace- -- -tamido)--cephalosporanic acid (158 mg., 0.4 millimole)

Signed and sealed this 25th day of July 1972.

(SEAL)
Attest:

EDWARD M. FLETCHER, JR.
Attesting Officer

ROBERT GOTTSCHALK
Commissioner of Patents